US011207923B2

(12) United States Patent
Yasunaga

(10) Patent No.: US 11,207,923 B2
(45) Date of Patent: Dec. 28, 2021

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 259 days.

(21) Appl. No.: 16/211,889

(22) Filed: Dec. 6, 2018

(65) Prior Publication Data

US 2019/0176527 A1    Jun. 13, 2019

(30) Foreign Application Priority Data

Dec. 13, 2017   (JP) .............................. JP2017-238882

(51) Int. Cl.
*B60C 11/01* (2006.01)
*B60C 11/12* (2006.01)
*B60C 11/03* (2006.01)

(52) U.S. Cl.
CPC .......... *B60C 11/0302* (2013.01); *B60C 11/01* (2013.01); *B60C 11/0306* (2013.01); *B60C 11/1204* (2013.01); *B60C 11/1236* (2013.01); *B60C 11/1281* (2013.01); *B60C 2011/013* (2013.01); *B60C 2011/0346* (2013.01); *B60C 2011/0383* (2013.01); *B60C 2011/0388* (2013.01); *B60C 2011/1209* (2013.01);
(Continued)

(58) Field of Classification Search
CPC . B60C 11/01; B60C 11/0302; B60C 11/1204; B60C 11/1236; B60C 11/1281; B60C 2011/013
See application file for complete search history.

(56) References Cited

U.S. PATENT DOCUMENTS

D394,623 S  *  5/1998  Carpino ...................... D12/603
D551,613 S  *  9/2007  Lo ............................... D12/564
(Continued)

FOREIGN PATENT DOCUMENTS

DE    102015221257 A1  *  5/2017
EP           609195 A1  *  8/1994
(Continued)

OTHER PUBLICATIONS

Machine translation for German 102015221257 (Year: 2020).*
(Continued)

*Primary Examiner* — Steven D Maki
(74) *Attorney, Agent, or Firm* — Westerman, Hattori, Daniels & Adrian, LLP

(57) ABSTRACT

To provide a pneumatic tire capable of improving rut running performance. In a pneumatic tire according to an embodiment, a shoulder block provided in a shoulder region of a tread portion is provided with a plurality of sipes which are formed at intervals in a tire circumferential direction to extend in a tire width direction. In the plurality of sipes, a dimple is provided on an outside in the tire width direction in relation to each tire ground contact end in a communication state. The dimple includes a portion formed with a wide width from a connection portion with the sipe toward the outside in the tire width direction and maximum width portions of the plurality of dimples are disposed to be offset in the tire width direction.

4 Claims, 4 Drawing Sheets

(52) U.S. Cl.
CPC .............. *B60C 2011/1213* (2013.01); *B60C 2011/1227* (2013.01); *B60C 2011/1245* (2013.01); *B60C 2011/1254* (2013.01)

(56) References Cited

U.S. PATENT DOCUMENTS

| | | | |
|---|---|---|---|
| D876,330 S * | 2/2020 | Poling | D12/601 |
| 2013/0213542 A1 | 8/2013 | Warfford et al. | |
| 2017/0057296 A1 | 3/2017 | Takemori | |
| 2018/0043737 A1 | 2/2018 | Akashi | |

FOREIGN PATENT DOCUMENTS

| | | | | |
|---|---|---|---|---|
| JP | 5920533 | B2 | | 5/2016 |
| KR | 2003-0089279 | A | * | 11/2003 |

OTHER PUBLICATIONS

Machine translation for Europe 609195 (Year: 2020).*
Derwent abstract for Korea 2003-0089279 (Year: 2021).*
Machine translation for Korea 2003-0089279 (Year: 2021).*
Office Action dated Jun. 30, 2020, issued in counterpart CN Application No. 201811387917.6, with English translation (10 pages).
Office Action dated Mar. 2, 2021, issued in counterpart CN application No. 201811387917.6, with English translation. (13 pages).
Office Action dated Jul. 30, 2021, issued in counterpart CN Application No. 201811387917.6, with English Translation. (14 pages).

* cited by examiner

PNEUMATIC TIRE

CROSS-REFERENCE TO RELATED APPLICATIONS

This application is based upon and claims the benefit of priority from the prior Japanese Patent Application No. 2017-238882, filed on Dec. 13, 2017; the entire contents of which are incorporated herein by reference.

BACKGROUND

1. Technical Field

An embodiment of the present invention relates to a pneumatic tire.

2. Description of the Related Art

For pneumatic tires used on icy and snowy roads, rut running performance that is running performance inside a rut (a rutted place) is required.

Conventionally, for example, Japanese Patent No. 5920533 proposes a technique in which a mud discharging dimple is provided to extend from the vicinity of a tire ground contact end of a shoulder block outward in a tire width direction in order to improve off-road performance of a tire, especially, running performance on a muddy road (mud performance). However, in Japanese Patent No. 5920533, since each shoulder block is provided with one dimple, there is no disclosure how to dispose a plurality of dimples.

SUMMARY

An object of an embodiment of the invention is to provide a pneumatic tire capable of improving rut running performance.

A pneumatic tire according to an embodiment of the invention is a pneumatic tire in which a land portion disposed between lateral grooves adjacent to each other in a tire circumferential direction in a shoulder region of a tread portion is provided with a plurality of sipes formed at intervals in the tire circumferential direction to extend in a tire width direction, in which each of the plurality of sipes, a dimple is provided at the outside in the tire width direction in relation to a tire ground contact end in a communication state, and in which the dimple includes a portion which is formed with a wide width from a connection portion with the sipe toward the outside in the tire width direction and maximum width portions of the plurality of dimples are disposed to be offset in the tire width direction.

According to the embodiment, it is possible to improve rut running performance by a plurality of dimples provided in a land portion of a shoulder region.

DETAILED DESCRIPTION

Figure 1:
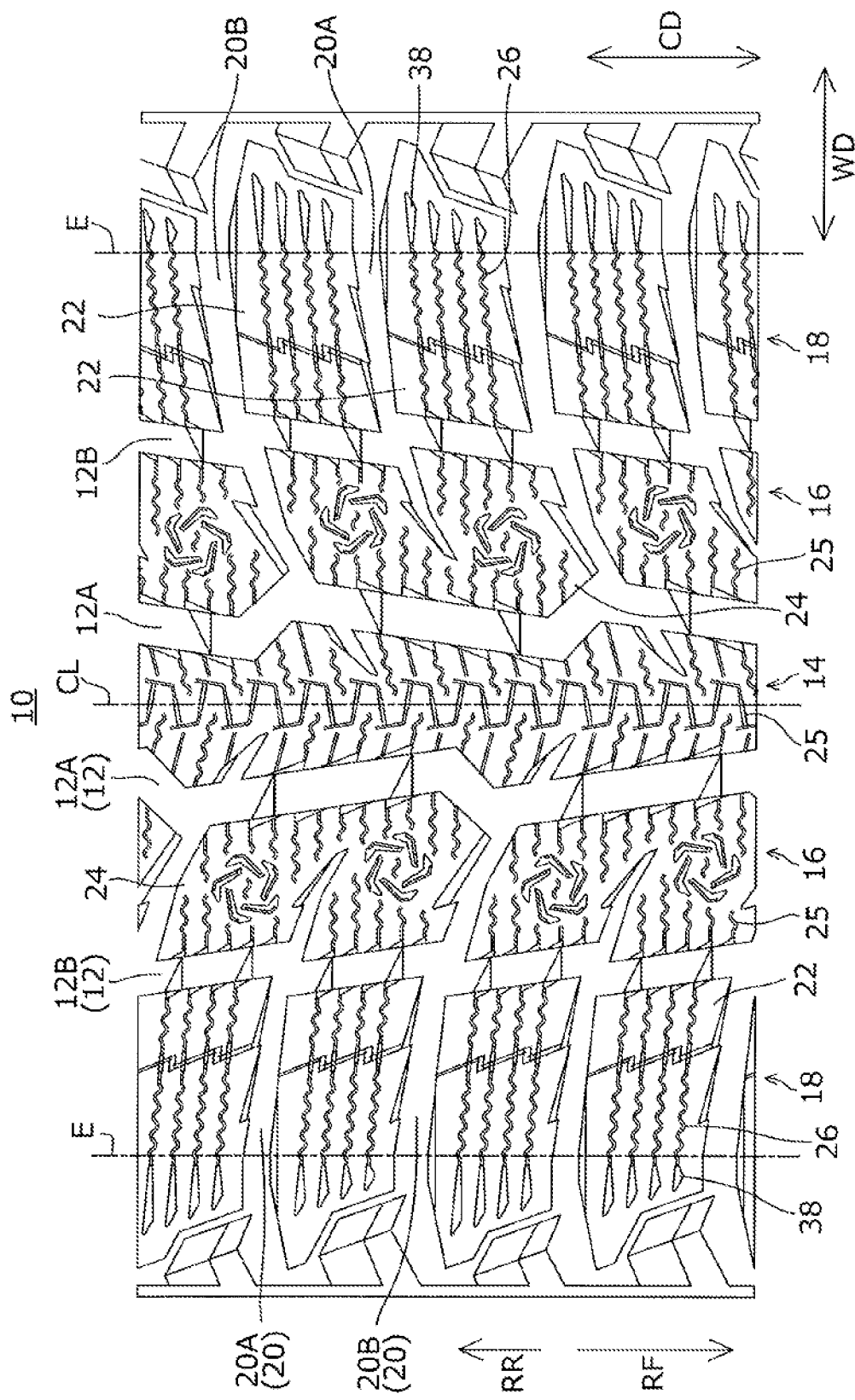
FIG. 1 is a developed view illustrating a tread pattern of a pneumatic tire according to an embodiment.

Hereinafter, an embodiment will be described with reference to the drawings.

Although not illustrated in the drawings, a pneumatic tire according to an embodiment includes a pair of right and left bead portions, a pair of right and left sidewall portions, and a tread portion provided between both sidewall portions to connect outer end portions of the right and left sidewall portions in the radial direction and a general tire structure can be used for a structure other than a tread pattern.

As illustrated in FIG. 1, a tread rubber surface of a tread portion 10 is provided with a plurality of main grooves 12 which extend in a tire circumferential direction CD and in this example, four main grooves are formed at intervals in a tire width direction WD. That is, a pair of center main grooves 12A and 12A is provided at both sides of a tire equator CL and a pair of shoulder main grooves 12B and 12B is disposed at the outside thereof. Four main grooves 12 are zigzag-shaped grooves which are bent with an amplitude in the tire width direction WD and extend in the tire circumferential direction CD. Furthermore, in FIG. 1, Reference Sign E indicates a tire ground contact end.

The pneumatic tire is a tire having a specified rotation direction and in the drawings, a rotation direction (that is, a front side in a rotation direction) is indicated by Reference Sign RF. The pneumatic tire is attached to a vehicle so that the tire rotates in a direction indicated by an arrow RF when the vehicle runs forward. As a mark for this purpose, a display for designating the rotation direction is provided on, for example, the sidewall portion or the like of the pneumatic tire. In the specification, a rear side in the rotation direction is a direction opposite to the rotation direction RF and is indicated by an arrow RR.

In the tread portion 10, a plurality of land portions are divided by the main groove 12 in the tire width direction WD. Specifically, a center land portion 14 interposed between the pair of center main grooves 12A and 12A, a pair of right and left intermediate land portions 16 and 16 interposed between the center main groove 12A and the shoulder main groove 12B, and a pair of right and left shoulder land portions 18 and 18 located at the outside of the shoulder main groove 12B in the tire width direction are provided.

In the tread portion 10, a plurality of lateral grooves 20 extending in the tire width direction WD are provided at intervals in the tire circumferential direction CD. As the lateral groove 20, a first lateral groove 20A which extends from the inside of the intermediate land portion 16 toward the outside in the tire width direction WD while being inclined in a curved shape and opens to the tire ground contact end E and a second lateral groove 20B which extends from the inside of the center land portion 14 toward the outside in the tire width direction WD while being inclined in a curved shape and opens to the tire ground contact end E are provided. The first lateral groove 20A and the second lateral groove 20B are alternately provided in the tire circumferential direction CD.

Accordingly, the center land portion 14 is not divided by the lateral groove 20 and is formed as a rib that extends in the tire circumferential direction CD. Meanwhile, the shoulder land portion 18 is divided by the first lateral groove 20A and the second lateral groove 20B to be formed as a block row in which a plurality of shoulder blocks 22 are arranged in the tire circumferential direction CD. Further, the intermediate land portion 16 is divided by the second lateral groove 20B to be formed as a block row in which an intermediate block 24 is disposed in the tire circumferential direction CD.

Furthermore, as illustrated in FIG. 1, the center land portion 14 and the intermediate land portion 16 are provided with a plurality of sipes 25.

The embodiment has a characteristic in the configuration of the shoulder land portion 18 and the configuration of the shoulder land portion 18 will be described in detail below with reference to FIGS. 1 to 4.

A shoulder block 22 constituting the shoulder land portion 18 is a land portion which is disposed between the lateral grooves 20A and 20B adjacent to each other in the tire circumferential direction CD in the shoulder region of the tread portion 10. The shoulder region is a region on the outside WO in the tire width direction in relation to the shoulder main groove 12B which is the main groove closest to the tire ground contact end E. The shoulder block 22 is divided by the shoulder main groove 12B and the front and rear lateral grooves 20A and 20B and the plurality of shoulder blocks 22 are arranged side by side along the tire ground contact end E. Here, the outside WO in the tire width direction indicates a direction moving away from the tire equator CL in the tire width direction WD.

Figure 2:
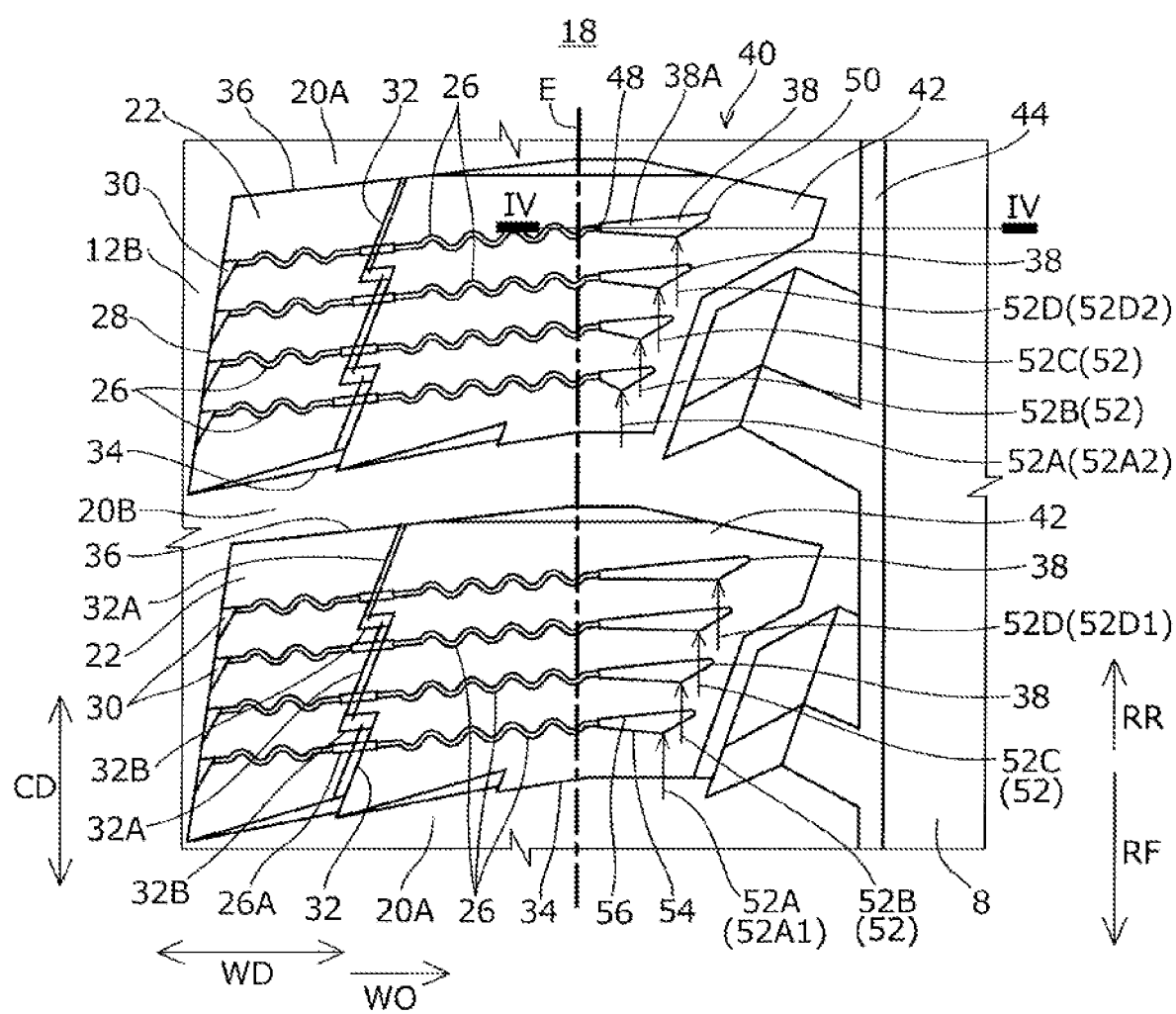
FIG. 2 is an enlarged view of a main part of the tread pattern.

As illustrated in FIG. 2, the shoulder block 22 is provided with a plurality of lateral sipes 26 which are formed at intervals in the tire circumferential direction CD to extend in the tire width direction WD. In this example, four lateral sipes 26 are provided in each shoulder block 22. The lateral sipe 26 is not limited to the lateral sipe which extends in parallel to the tire width direction WD and may obliquely extend as long as the lateral sipe extends in the tire width direction WD.

In the lateral sipe 26, one end in the extension direction opens to the shoulder main groove 12B and the other end extends to the tire ground contact end E. Specifically, an edge portion 28 of the shoulder block 22 on the side of the shoulder main groove 12B is provided with a plurality of notch portions 30 which are formed at intervals in the tire circumferential direction CD and have a triangular shape in the plan view and one end of the lateral sipe 26 opens to the shoulder main groove 12B at an apex corner portion of the notch portion 30.

The lateral sipe 26 is a sipe of which a cross-sectional shape is wavy and a straight portion may be included in a part of the lateral sipe mainly formed in a wavy shape. Here, the wavy shape is not limited to a curved wavy shape and also includes a zigzag shape. In this example, the lateral sipe 26 is formed such that a center portion in the extension direction is provided with a straight portion 26A of a shallow groove depth and both sides of the straight portion 26A are formed in a wavy shape.

Further, the shoulder block 22 is provided with a longitudinal sipe 32 which extends in the tire circumferential direction CD to intersect the plurality of lateral sipes 26. In the longitudinal sipe 32, both ends in the extension direction are formed to respectively open to both front and rear edge portions 34 and 36 of the shoulder block 22. Specifically, the longitudinal sipe 32 is formed in a zigzag shape in which a plurality of (three in the drawings) sipe portions 32A having a straight cross-sectional shape and obliquely extending with respect to the tire circumferential direction CD are connected through a shallow groove 32B extending in the tire width direction WD and intersects the straight portion 26A of the lateral sipe 26 at the sipe portion 32A.

The groove widths of the lateral sipe 26 and the longitudinal sipe 32 are not particularly limited and may be, for example, 0.1 to 1.0 mm, 0.2 to 0.8 mm, or 0.3 to 0.6 mm. The groove depths of the lateral sipe 26 and the longitudinal sipe 32 are not particularly limited and may be, for example, 30 to 80% of the main groove depth.

Figure 3:
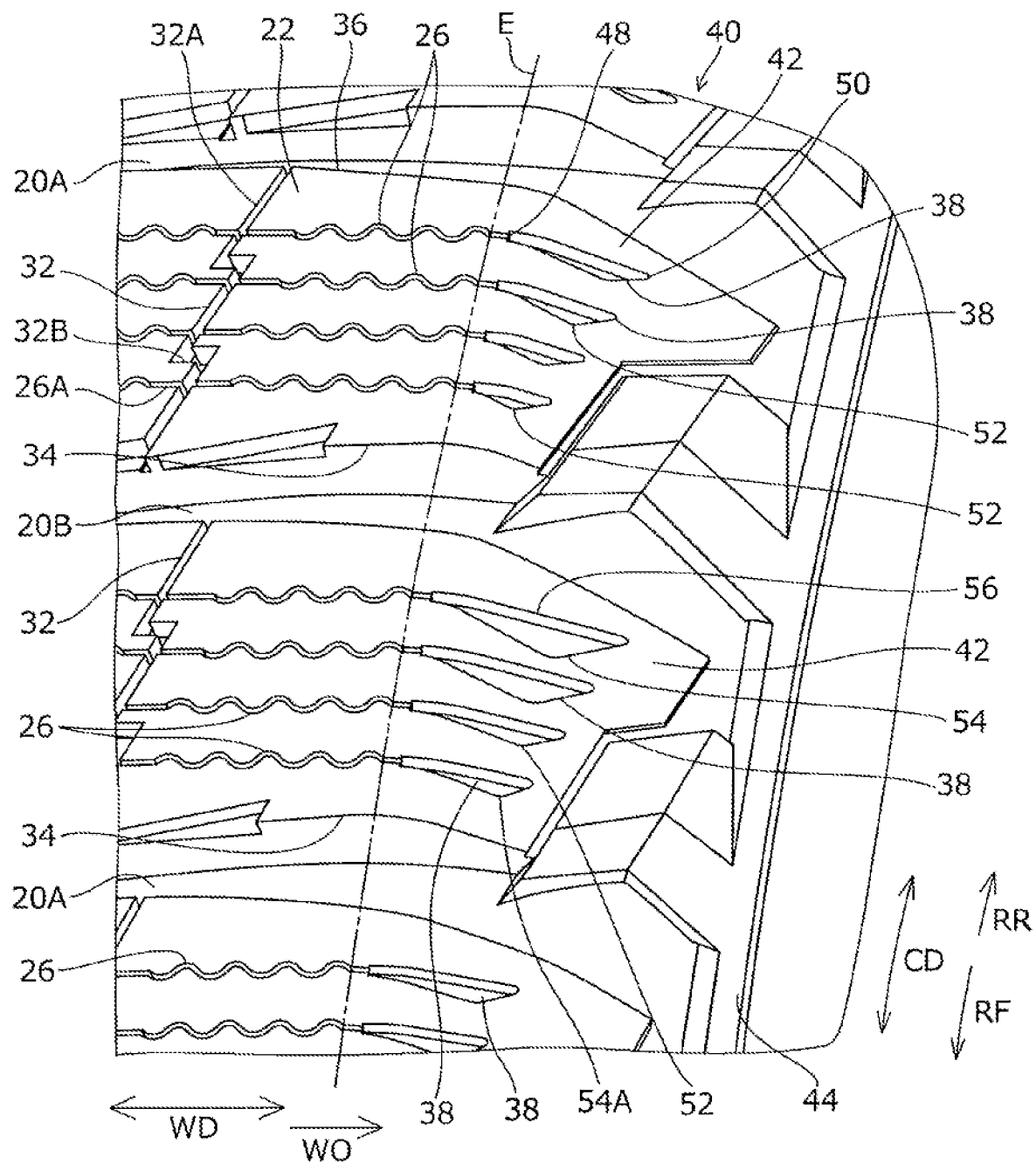
FIG. 3 is an enlarged perspective view in the vicinity of a tire ground contact end of the pneumatic tire.

As illustrated in FIGS. 2 and 3, in each of the plurality of lateral sipes 26, a dimple 38 is provided on the outside WO in the tire width direction in relation to the tire ground contact end E in a communication state. The dimple 38 is a recess which has a wide width and a shallow depth as compared to the lateral sipe 26 and is formed to extend from the vicinity of the tire ground contact end E in the tire width direction WD. A depth D1 (see FIG. 4) of the dimple 38 is not particularly limited, but may be, for example, about 0.5 to 3 mm. In this example, the depth D1 of the dimple 38 is set to be constant in the tire width direction WD.

Figure 4:
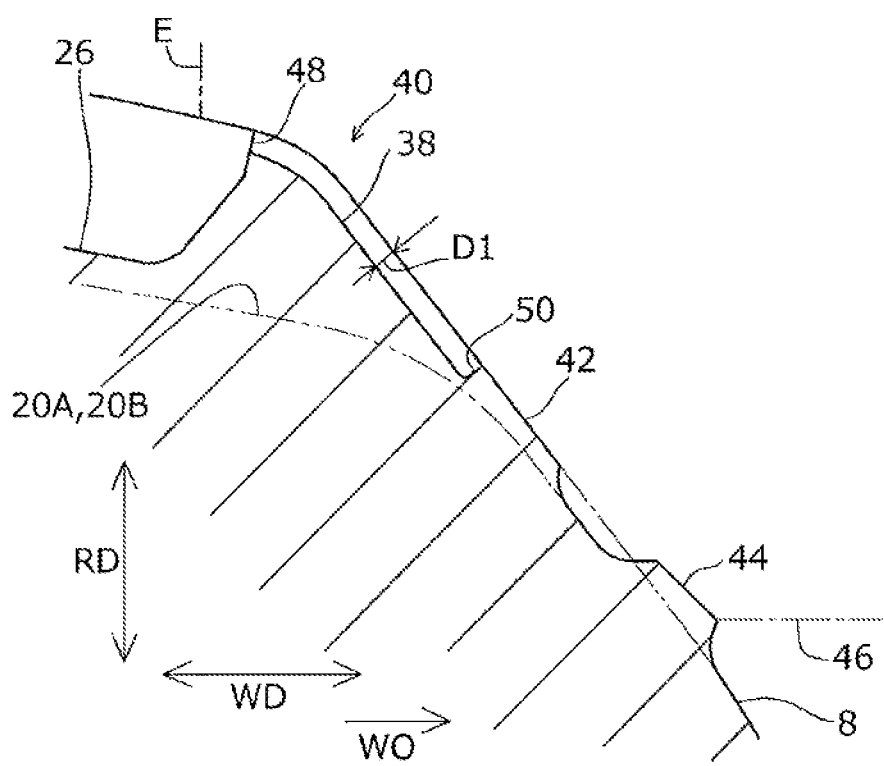
FIG. 4 is a cross-sectional view taken along a line IV-IV of FIG. 2.

The dimple 38 is provided in an extension portion 42 of the shoulder block 22 in a buttress portion 40 from the tire ground contact end E to the sidewall portion 8. The extension portion 42 is a portion in which the shoulder block 22 protruding with respect to the front and rear lateral grooves 20A and 20B extends to the buttress portion 40 beyond the tire ground contact end E and protrudes with respect to the front and rear lateral grooves 20A and 20B as illustrated in FIG. 3. As illustrated in FIG. 4, the extension portion 42 is formed such that an upper surface (that is, a surface) is inclined inward in a tire radial direction RD so that the raised height from the lateral grooves 20A and 20B gradually decreases toward the outside WO in the tire width direction.

Here, the buttress portion 40 is a region which is located on the outside WO in the tire width direction in relation to the tire ground contact end E and is located on the side of the tire ground contact end E in relation to the sidewall portion 8. In this example, a ridge 44 which extends in the tire circumferential direction CD is provided at the boundary between the sidewall portion 8 and the buttress portion 40. As illustrated in FIG. 4, the ridge 44 is set as a split position (parting line) 46 between a die for molding the tread portion 10 and a die for molding the sidewall portion 8.

In this example, an inner end portion 48 of the dimple 38 on the inside in the tire width direction is located on the outside WO in the tire width direction in relation to the tire ground contact end E. Meanwhile, an outer end portion 50 on the outside in the tire width direction is provided to be terminated inside the extension portion 42.

As illustrated in FIG. 2, the dimple 38 includes a portion 38A which is formed with a wide width toward the outside WO in the tire width direction from the end portion 48 which is the connection portion with the lateral sipe 26. Specifically, the dimple 38 is formed to gradually increase in width from the end portion 48 toward the outside WO in the tire width direction. A maximum width portion 52 having a maximum width is formed and then the width is gradually narrowed and terminated. Here, the width of the dimple 38 indicates the width (that is, the opening width) of the opening surface (that is, the surface of the extension portion 42) in the tire circumferential direction CD.

In this example, the dimple 38 is formed such that a stepping side edge portion 54 is bent in a convex shape toward the front side RF in the rotation direction and a kicking side edge portion 56 is formed in a straight shape. The stepping side edge portion 54 indicates an edge portion on the front side RF in the rotation direction among the front and rear edge portions facing each other of the dimple 38 in the tire circumferential direction CD and the kicking side edge portion 56 indicates an edge portion on the rear side RR in the rotation direction.

The stepping side edge portion 54 includes a bent portion 54A (see FIG. 3) which protrudes toward the front side RF in the rotation direction. For that reason, the dimple 38 is formed such that a position of the bent portion 54A becomes the maximum width portion 52 and inner and outer portions in the tire width direction WD are narrower than the maximum width portion 52.

As illustrated in FIG. 2, in each shoulder block 22, the maximum width portions 52 of the plurality of (four in this example) dimples 38 are disposed to be offset from each other in the tire width direction WD. That is, in each shoulder block 22, the plurality of maximum width portions 52 are set to different positions while the positions in the tire width direction WD are not the same.

In this example, in each shoulder block 22, the maximum width portions 52 of the plurality of dimples 38 are sequentially located on the outside WO in the tire width direction toward the rear side RR in the rotation direction. That is, the maximum width portion 52 is located on the outside WO in the tire width direction as it goes to the dimple 38 located on the rear side RR in the rotation direction. Specifically, as illustrated in FIG. 2, when the maximum width portions 52 of each dimple 38 are sequentially set to 52A, 52B, 52C, and 52D from the stepping side toward the kicking side of the shoulder block 22, the maximum width portion 52A on the stepping side is located on the innermost side in the tire width direction WD and then the maximum width portion 52B, the maximum width portion 52C, and the maximum width portion 52D are disposed in this order toward the outside WO in the tire width direction.

Further, in this example, in two shoulder blocks 22 adjacent to each other in the tire circumferential direction CD, a maximum width portion 52A1 located on the innermost side in the tire width direction of one shoulder block 22 and a maximum width portion 52A2 located on the innermost side in the tire width direction of the other shoulder block 22 are disposed at different positions in the tire width direction WD. Further, a maximum width portion 52D1 located on the outermost side in the tire width direction of one shoulder block 22 and a maximum width portion 52D2 located on the outermost side in the tire width direction of the other shoulder block 22 are disposed at different positions in the tire width direction WD.

As described above, the extension length of the dimple 38 increases toward the dimple 38 located on the rear side RR in the rotation direction as the maximum width portions 52 are sequentially located on the outside WO in the tire width direction toward the rear side RR in the rotation direction.

According to the pneumatic tire of the embodiment with the above-described configuration, since the buttress portion 40 is provided with the dimple 38 communicating with the lateral sipe 26 of the shoulder block 22, it is possible to improve the traction performance at the shoulder end. Specifically, for example, when running on deep snowy roads, snow pillars are formed with snow biting into the dimple 38. Thus, since the snow pillar is hooked, it is possible to improve the traction performance and thus to improve the rut running performance.

Further, since the dimple 38 communicates with the lateral sipe 26, it is possible to further improve the traction performance by increasing an edge component.

Further, since the dimple 38 is formed with a wide width toward the outside WO in the tire width direction, it is possible to ensure the rigidity in the vicinity of the tire ground contact end E. Accordingly, it is possible to improve the water discharge property and the snow discharge property toward the outside of a wide width while improving the wear resistance.

Further, since the maximum width portions 52 of the plurality of dimples 38 are provided to be offset from each other in the tire width direction WD, the maximum width portion 52 capable of forming a strong snow pillar can be formed in a wide range of the tire width direction WD. Accordingly, since the effective range contributing to the traction performance increases, the rut performance can be further improved. Further, since the plurality of maximum width portions 52 are provided to be sequentially located on the outside WO in the tire width direction toward the rear side RR in the rotation direction, the effect can be improved.

Further, since the dimple 38 is formed to be bent at the stepping side edge portion 54 and to be straight at the kicking side edge portion 56, it is easy to take in snow from the stepping side bent portion 54A. Further, since the kicking side edge portion 56 is straight and is not bent, the snow pillar formed by the dimple 38 can be strongly pressed at the straight portion and hence the traction performance can be further improved.

Furthermore, in the above-described embodiment, all of the shoulder blocks 22 provided in the tread portion 10 are provided with the plurality of dimples 38, but a structure provided in all of the shoulder blocks 22 is not limited. For example, the plurality of dimples 38 may be alternately provided among the plurality of shoulder blocks 22 provided side by side in the tire circumferential direction CD or the plurality of dimples 38 may be provided only in the shoulder block 22 on one side in the tire width direction WD.

Further, in the above-described embodiment, the shoulder blocks 22 completely divided by the front and rear lateral grooves 20A and 20B have been described as the land portion disposed in the shoulder region, but the land portion of the shoulder region corresponding to a target of the embodiment is not limited to the shoulder block completely divided in this way. For example, the shoulder land portion may be continuous in the tire circumferential direction in such a manner that the front and rear shoulder blocks are connected to each other by the narrow connection land portion on the inside in the width direction (that is, the side of the shoulder main groove). That is, the land portion of the shoulder region corresponding to a target of the embodiment may be divided into the front and rear land portions by the front and rear lateral grooves adjacent to each other in the tire circumferential direction at a position on the side of at least the tire ground contact end.

Furthermore, the dimensions in the specification are those in a normal state without any load in a state in which a pneumatic tire is mounted on a regular rim and is filled with a normal internal pressure. The regular rim is "Standard Rim" in the JATMA standard, "Design Rim" in the TRA standard, or "Measuring Rim" in the ETRTO standard. The normal internal pressure is "MAXMIMUM AIR PRESSURE" in the JATMA standard, the "maximum value" described in "TIRE LOAD LIMITS AT VARIOUS COLD INFLATION PRESSURES" in the TRA standard, or "INFLATION PRESSURE" in the ETRTO standard.

The tire ground contact end E indicates the outermost position of the ground contact surface in the tire width direction. The ground contact surface indicates a surface of the tread portion which contacts a road when the tire is assembled to a regular rim, is filled with a normal internal pressure, and is vertically located on a flat road when a normal load applied to the tire. The normal load is a load that each standard prescribes for each tire in the standard system including the standard on which the tire is based and is MAXIMUM LOAD CAPACITY in JATMA, MAXIMUM VALUE listed in the table for TRA, or "LOAD CAPACITY" in ETRTO. However, when the tire is for a passenger car, a load is set to 88% of the above-described load.

As the pneumatic tire according to the embodiment, tires for various vehicles such as a tire for a passenger car and a heavy duty tire for a truck, a bus, or a light truck (for example, a SUV car and a pickup truck) can be exemplified. Further, the application of the pneumatic tire is not particularly limited and the pneumatic tire may be used as all season tires and winter tires.

Although several embodiments have been described above, these embodiments have been suggested as an example and are not intended to limit the scope of the invention. These embodiments can be implemented in various other forms and can be implemented while being omitted, replaced, or changed in various ways without departing from the gist of the invention. These embodiments and modifications thereof are included in the scope and gist of the invention as well as in the scope of the invention described in the claims and their equivalents.

What is claimed is:

1. A pneumatic tire in which a land portion disposed between lateral grooves adjacent to each other in a tire circumferential direction in a shoulder region of a tread portion is provided with a plurality of sipes formed at intervals in the tire circumferential direction to extend in a tire width direction, wherein in each of the plurality of sipes, a dimple is provided at the outside in the tire width direction in relation to a tire ground contact end in a communication state, and wherein each dimple includes an inner end portion at which each dimple is connected with one of the sipes, a maximum width portion which has a maximum width in each dimple and provided to be offset from the maximum width portions of the other dimples in the tire width direction, and an outer end portion, wherein each dimple is formed to gradually expand in width from the inner end portion toward a direction moving away from a tire equator in the tire width direction up to the maximum width portion, and gradually narrow in width, and terminate at the outer end portion, wherein each dimple is physically separate from the other dimples, wherein two or more land portions are each disposed between two of the lateral grooves adjacent to each other in the tire circumferential direction in the shoulder region of the tread portion, wherein, in two of the land portions adjacent to each other in the tire circumferential direction, a maximum width portion located on an innermost side in the tire width direction of one of the two of the land portions and a maximum width portion located on an innermost side in the tire width direction of the other of the two of the land portions are disposed at different positions in the tire width direction, and wherein a maximum width portion located on an outermost side in the tire width direction of the one of the two of the land portions and a maximum width portion located on an outermost side in the tire width direction of the other of the two of the land portions are disposed at different positions in the tire width direction.

2. A pneumatic tire in which a land portion disposed between lateral grooves adjacent to each other in a tire circumferential direction in a shoulder region of a tread portion is provided with a plurality of sipes formed at intervals in the tire circumferential direction to extend in a tire width direction, wherein in each of the plurality of sipes, a dimple is provided at the outside in the tire width direction in relation to a tire ground contact end in a communication state, and wherein each dimple includes an inner end portion at which each dimple is connected with one of the sipes, a maximum width portion which has a maximum width in each dimple and provided to be offset from the maximum width portions of the other dimples in the tire width direction, and an outer end portion, wherein each dimple is formed to gradually expand in width from the inner end portion toward a direction moving away from a tire equator in the tire width direction up to the maximum width portion, and gradually narrow in width, and terminate at the outer end portion, wherein each dimple is physically separate from the other dimples, wherein the pneumatic tire is a tire having a specified rotation direction, wherein the maximum width portions of the plurality of dimples are sequentially located outward in the tire width direction toward a rear side in the rotation direction, wherein two or more land portions are each disposed between two of the lateral grooves adjacent to each other in the tire circumferential direction in the shoulder region of the tread portion, wherein, in two of the land portions adjacent to each other in the tire circumferential direction, a maximum width portion located on an innermost side in the tire width direction of one of the two of the land portions and a maximum width portion located on an innermost side in the tire width direction of the other of the two of the land portions are disposed at different positions in the tire width direction, and wherein a maximum width portion located on an outermost side in the tire width direction of the one of the two of the land portions and a maximum width portion located on an outermost side in the tire width direction of the other of the two of the land portions are disposed at different positions in the tire width direction.

3. A pneumatic tire in which a land portion disposed between lateral grooves adjacent to each other in a tire circumferential direction in a shoulder region of a tread portion is provided with a plurality of sipes formed at intervals in the tire circumferential direction to extend in a tire width direction, wherein in each of the plurality of sipes, a dimple is provided at the outside in the tire width direction in relation to a tire ground contact end in a communication state, and wherein each dimple includes an inner end portion at which each dimple is connected with one of the sipes, a maximum width portion which has a maximum width in each dimple and provided to be offset from the maximum width portions of the other dimples in the tire width direction, and an outer end portion, wherein each dimple is formed to gradually expand in width from the inner end portion toward a direction moving away from a tire equator in the tire width direction up to the maximum width portion, and gradually narrow in width, and terminate at the outer end portion, wherein each dimple is physically separate from the other dimples, wherein the pneumatic tire is a tire having a specified rotation direction, wherein each dimple is formed such that a stepping side edge portion is bent in a convex shape toward a front side in the rotation direction and a kicking side edge portion is formed in a straight shape, wherein two or more land portions are each disposed between two of the lateral grooves adjacent to each other in the tire circumferential direction in the shoulder region of the tread portion, wherein, in two of the land portions adjacent to each other in the tire circumferential direction, a maximum width portion located on an innermost side in the tire width direction of one of the two of the land portions and a maximum width portion located on an innermost side in the tire width direction of the other of the two of the land portions are disposed at different positions in the tire width direction, and wherein a maximum width portion located on an outermost side in the tire width direction of the one of the two of the land portions and a maximum width portion located on an outermost side in the tire width direction of the other of the two of the land portions are disposed at different positions in the tire width direction.

4. A pneumatic tire in which a land portion disposed between lateral grooves adjacent to each other in a tire circumferential direction in a shoulder region of a tread portion is provided with a plurality of sipes formed at intervals in the tire circumferential direction to extend in a tire width direction, wherein in each of the plurality of sipes, a dimple is provided at the outside in the tire width direction in relation to a tire ground contact end in a communication state, and wherein each dimple includes an inner end portion at which each dimple is connected with one of the sipes, a maximum width portion which has a maximum width in each dimple and provided to be offset from the maximum width portions of the other dimples in the tire width direction, and an outer end portion, wherein each dimple is formed to gradually expand in width from the inner end portion toward a direction moving away from a tire equator in the tire width direction up to the maximum width portion, and gradually narrow in width, and terminate at the outer end portion, wherein each dimple is physically separate from the other dimples, wherein the pneumatic tire is a tire having a specified rotation direction, wherein the maximum width portions of the plurality of dimples are sequentially located outward in the tire width direction toward a rear side in the rotation direction, wherein each dimple is formed such that a stepping side edge portion is bent in a convex shape toward a front side in the rotation direction and a kicking side edge portion is formed in a straight shape, wherein two or more land portions are each disposed between two of the lateral grooves adjacent to each other in the tire circumferential direction in the shoulder region of the tread portion, wherein, in two of the land portions adjacent to each other in the tire circumferential direction, a maximum width portion located on an innermost side in the tire width direction of one of the two of the land portions and a maximum width portion located on an innermost side in the tire width direction of the other of the two of the land portions are disposed at different positions in the tire width direction, and wherein a maximum width portion located on an outermost side in the tire width direction of the one of the two of the land portions and a maximum width portion located on an outermost side in the tire width direction of the other of the two of the land portions are disposed at different positions in the tire width direction.

* * * * *